US011118717B2

(12) United States Patent
Nishio et al.

(10) Patent No.: US 11,118,717 B2
(45) Date of Patent: Sep. 14, 2021

(54) MALE COUPLING MEMBER

(71) Applicants: NITTO KOHKI CO., LTD., Tokyo (JP); TOYOTA JIDOSHA KABUSHIKI KAISHA, Toyota (JP)

(72) Inventors: Takuya Nishio, Tokyo (JP); Hidetoshi Nohara, Tokyo (JP); Hirofumi Onishi, Toyota (JP); Masaaki Kondo, Toyota (JP); Akira Yamashita, Toyota (JP)

(73) Assignees: NITTO KOHKI CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 452 days.

(21) Appl. No.: 16/001,402

(22) Filed: Jun. 6, 2018

(65) Prior Publication Data

US 2018/0283594 A1 Oct. 4, 2018

Related U.S. Application Data

(63) Continuation of application No. PCT/JP2016/086317, filed on Dec. 7, 2016.

(30) Foreign Application Priority Data

Dec. 7, 2015 (JP) .............................. JP2015-238900

(51) Int. Cl.
*F16L 55/24* (2006.01)
*F16L 55/10* (2006.01)
(Continued)

(52) U.S. Cl.
CPC .............. *F16L 55/24* (2013.01); *B60K 15/00* (2013.01); *F16K 15/06* (2013.01); *F16K 15/063* (2013.01);
(Continued)

(58) Field of Classification Search
CPC ....... F16L 55/24; F16L 55/1015; F16L 21/00; F16L 17/02; F17C 2205/037
(Continued)

(56) References Cited

U.S. PATENT DOCUMENTS 2,459,286 A * 1/1949 Wiegand ................ F02M 61/08
  313/11.5
6,050,298 A * 4/2000 Lacroix ................... F16L 37/42
  137/614.05

(Continued)

FOREIGN PATENT DOCUMENTS

EP   1577598      9/2005
FR   1410656 A *  9/1965  .............. F16L 55/24
(Continued)

OTHER PUBLICATIONS

International Search Report for International Application PCT/JP2016/086317, dated Mar. 7, 2017.

*Primary Examiner* — Matthew Troutman
*Assistant Examiner* — Fannie C Kee
(74) *Attorney, Agent, or Firm* — Burris Law, PLLC

(57) ABSTRACT

A male coupling member detachably couplable to a female coupling member includes an outer coupling body having a first end inserted and fitted into the female coupling member, a second end opposite to the first end, and a passage extending from the first end to the second end. The male coupling member further includes an inner coupling body disposed coaxially with the outer coupling body at a position closer to the first end, and a filtration member detachably attached to the inner coupling body. The inner coupling body is attachable to and detachable from the outer coupling body from the first end. The filtration member is held in the passage when the inner coupling body is attached to the outer coupling body. The filtration member is detachable
(Continued)

when the inner coupling body is detached from the outer coupling body.

5 Claims, 2 Drawing Sheets

(51) Int. Cl.
  *F16L 21/00* (2006.01)
  *B60K 15/00* (2006.01)
  *F16L 29/04* (2006.01)
  *F17C 1/00* (2006.01)
  *F16K 15/06* (2006.01)
  *B60K 15/03* (2006.01)

(52) U.S. Cl.
  CPC ............... *F16L 21/00* (2013.01); *F16L 29/04* (2013.01); *F16L 55/1015* (2013.01); *F17C 1/00* (2013.01); *B60K 2015/03019* (2013.01); *B60Y 2400/202* (2013.01); *F17C 2205/037* (2013.01); *F17C 2221/012* (2013.01); *F17C 2270/0184* (2013.01)

(58) Field of Classification Search
  USPC ........................................................ 285/119
  See application file for complete search history.

(56) References Cited

U.S. PATENT DOCUMENTS

| | | | |
|---|---|---|---|
| 8,480,883 B2 * | 7/2013 | Stimpson | ............... G01F 15/18 210/87 |
| 2010/0108162 A1 | 5/2010 | Nishio et al. | |
| 2011/0101675 A1 * | 5/2011 | Smith, III | ............. E21B 33/038 285/119 |
| 2014/0175004 A1 | 6/2014 | Tsuchiya | |
| 2016/0018013 A1 | 1/2016 | Nishio et al. | |
| 2016/0131273 A1 | 5/2016 | Onishi et al. | |

FOREIGN PATENT DOCUMENTS

| | | | |
|---|---|---|---|
| FR | 2868504 A1 * | 10/2005 | ............. F17C 13/04 |
| JP | H0942580 | 2/1997 | |
| JP | 2000002393 | 1/2000 | |
| JP | 2005201404 | 7/2005 | |
| JP | 2008232361 | 10/2008 | |
| JP | 3150057 | 4/2009 | |
| JP | 2010534815 | 11/2010 | |
| JP | 201144293 | 3/2011 | |
| JP | 2013213526 | 10/2013 | |
| JP | 2014125928 | 7/2014 | |
| JP | 2014181777 | 9/2014 | |
| JP | 2014202254 | 10/2014 | |
| JP | 6219806 | 10/2017 | |
| WO | 2013115120 | 8/2013 | |
| WO | 2014163131 | 10/2014 | |
| WO | 2016167677 | 10/2016 | |

* cited by examiner

MALE COUPLING MEMBER

CROSS-REFERENCE TO RELATED APPLICATIONS

This application is a continuation of International Application No. PCT/JP2016/086317, filed on Dec. 7, 2016, which claims priority to and the benefit of JP 2015-238900 filed on Dec. 7, 2015. The disclosures of the above applications are incorporated herein by reference.

FIELD

The present disclosure relates to a male coupling member detachably couplable to an associated female coupling member.

BACKGROUND

The statements in this section merely provide background information related to the present disclosure and may not constitute prior art.

A fuel cell vehicle, for example, has a receptacle (male coupling member) attached to a fuel supply part of the vehicle body. The receptacle is detachably couplable to a nozzle (female coupling member) provided at a hydrogen supply station supplying hydrogen used as a fuel. When hydrogen supply is not performed, the receptacle is closed at its upstream opening with a cap to prevent dust or other contaminants from entering the inside of the receptacle. When the nozzle at the hydrogen supply station is to be coupled to the receptacle, however, the cap is removed from the receptacle, and the upstream opening and the fluid passage are exposed to the outside air. Accordingly, dust or the like may enter the inside of the fluid passage. Also, some dust or the like may adhere to the nozzle at the hydrogen supply station. Further, hydrogen supplied from the hydrogen supply station per se may contain dust or the like. Therefore, such dust may be contained in hydrogen that is supplied from the hydrogen supply station through the receptacle. Accordingly, the receptacle is conventionally provided with a filtration member to remove dust from hydrogen to be supplied into the vehicle body (Japanese Patent Application Publication No. 2014-202254).

In the above-described male coupling member having a filtration member, dust gradually accumulates in the filtration medium of the filtration member as the male coupling member is repeatedly used. Therefore, the filtration member becomes necessary to replace when the male coupling member has been used a certain number of times. Conventionally, it is necessary, in order to replace the filtration member, to detach the male coupling member completely from the vehicle body or the like before disassembling the male coupling body. However, the male coupling member is secured to the vehicle body or the like and also has a pipe secured thereto. Therefore, it is a troublesome and complicated operation to detach the male coupling member, replace the filtration member, and reattach the male coupling member thereafter. In addition, if the pipe is not connected appropriately when the male coupling member is reattached, a fluid such as hydrogen may leak.

SUMMARY

The present disclosure provides a male coupling member configured to enable replacement of the filtration member with the male coupling member left attached to the vehicle body or the like.

The present disclosure provides a male coupling member detachably couplable to an associated female coupling member. The male coupling member includes the following elements: a cylindrical outer coupling body having a first end to be inserted and fitted into a female coupling member, a second end opposite to the first end, and a passage extending from the first end to the second end in the direction of a longitudinal axis; a cylindrical inner coupling body disposed in the passage at a position closer to the first end and coaxially with the outer coupling body, the inner coupling body being detachably attached to the outer coupling body from the first end; and a filtration member detachably attached to at least one of the outer coupling body and the inner coupling body, the filtration member being held in the passage when the inner coupling body is attached to the outer coupling body, the filtration member being detachable from at least one of the outer coupling body and the inner coupling body when the inner coupling body is detached from the outer coupling body.

In one form, the inner coupling body is attachable to and detachable from the outer coupling body, which is usually secured to another member, e.g. the vehicle body, and also secured to a pipe, so that the filtration member can be detached by detaching the inner coupling body from the outer coupling body. Accordingly, the filtration member can be replaced without detaching the outer coupling body from another member to which the outer coupling body is secured, and the operation of replacing the filtration member is facilitated as compared to the above-described conventional male coupling member.

Specifically, the filtration member may be detachably attached to the inner coupling body.

In one form, the arrangement may be as follows. The filtration member includes a cylindrical part that has a filtration portion and extending in the direction of the longitudinal axis, a downstream closing end portion that closes the cylindrical part at a position closer to the second end than the filtration portion, and a flange portion that projects from the cylindrical part in the radial direction of the cylindrical part. The outer coupling body includes a retaining portion extending radially inward from the peripheral wall surface of the passage at a position closer to the second end than the flange portion. The displacement of the filtration member toward the second end is suppressed by abutment of the flange portion and the retaining portion in the direction of the longitudinal axis.

In another form, the arrangement may be as follows. The flange portion includes a through-hole extending therethrough in the direction of the longitudinal axis. The through-hole constitutes a part of a flow path of a fluid passing through the passage.

Alternatively, the filtration member may be detachably secured to a peripheral wall surface of the passage in the outer coupling body.

In yet another form, the arrangement may be as follows. The inner coupling body includes a nozzle insertion port configured to receive a nozzle distal end of the female coupling member. The male coupling member further includes a seal ring fitted to the inner peripheral surface of the nozzle insertion port to sealingly engage the nozzle distal end.

The seal ring, which is sealingly engaged with the nozzle distal end, gradually wears as the nozzle distal end is repeatedly inserted thereinto. Therefore, replacement of the seal ring may be desired when the number of times of use thereof reaches a certain level. In the male coupling member, the seal ring is provided in the inner coupling body; therefore, the seal ring can be detached together with the inner coupling body by detaching the inner coupling body from the outer coupling body. Accordingly, the seal ring replacing operation can be performed simultaneously with the filtration member replacing operation in an environment where the operation can be easily performed.

Various forms of the male coupling member according to the present disclosure will be explained below based on the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
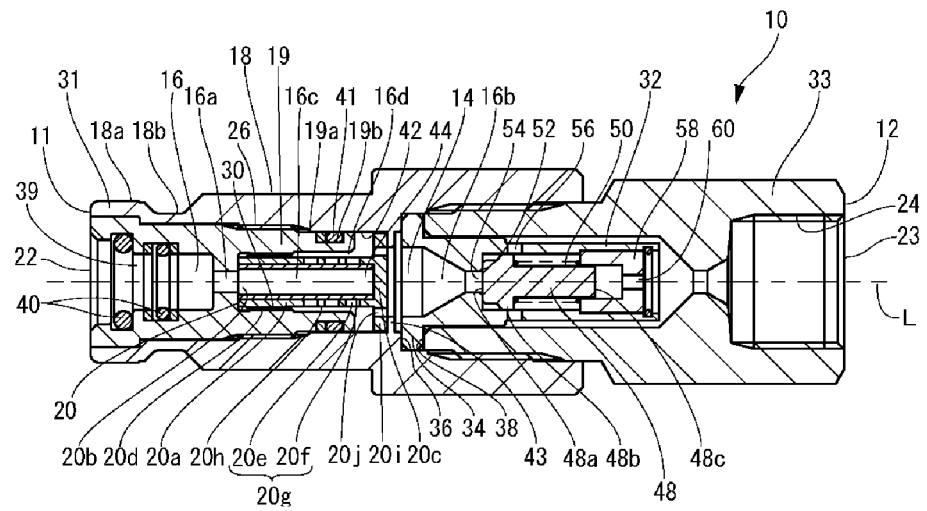
FIG. 1 is a sectional view of a male coupling member according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a male coupling member 10 according to a first form of the present disclosure includes a cylindrical outer coupling body 18, a cylindrical inner coupling body 19, and a filtration member 20. The outer coupling body 18 has a first end 11 located at the left side, a second end 12 located at the right side, and defines a passage 14 extending from the first end 11 to the second end 12 in the direction of a longitudinal axis L. The inner coupling body 19 is disposed in the passage 14 at a position closer to the first end 11 coaxially with the outer coupling body 18. The filtration member 20 is secured to the inner coupling body 19 and held in the passage 14. The male coupling member 10 is a receptacle (male coupling member) attached to a fuel cell vehicle and used as a hydrogen supply port.

Figure 2:
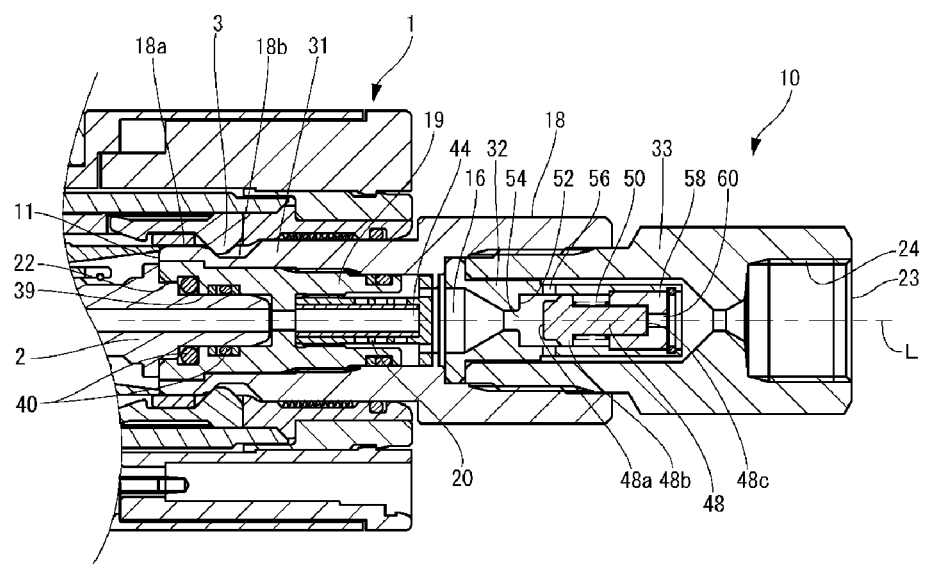
FIG. 2 is an illustration of the male coupling member of FIG. 1 coupled to a nozzle at a hydrogen supply station to receive hydrogen.

As shown in FIG. 2, the male coupling member 10 has the first end 11 inserted and fitted into a nozzle (coupling member) 1 provided at the distal end of a hydrogen supply hose at a hydrogen supply station, and a locking element 3 of the nozzle 1 is engaged with a locking element engaging groove 18b formed at an outer peripheral surface 18a of the outer coupling body 18. Thus, the male coupling member 10 is coupled to the nozzle 1 to receive hydrogen supplied from the hydrogen supply station. The outer coupling body 18 and the inner coupling body 19 constitute a fluid passage 16 extending in the direction of the longitudinal axis L from an upstream opening 22 formed in the inner coupling body 19 to a downstream opening 23 formed in the outer coupling body 18. Hydrogen received from the upstream opening 22 passes through the filtration member 20 to reach the downstream opening 23. The downstream opening 23 has a pipe connecting portion 24 formed therein. The pipe connecting portion 24 is connectable with a hydrogen pipe extending from a hydrogen tank disposed in the vehicle body.

The outer coupling body 18 comprises a first body member 31 having the locking element engaging groove 18b, a second body member 32 retaining a check valve 48, which is described in greater detail below, and a third body member 33 formed with the downstream opening 23 and secured to the first body member 31. The first body member 31 defines an internally threaded portion 26 formed therein. The inner coupling body 19 is secured to the first body member 31 through the internally threaded portion 26. The second body member 32 includes a clamping flange portion 34 projecting radially outward. The clamping flange portion 34 is clamped between a locking surface 36 of the first body member 31 and a locking surface 38 of the third body member 33, thereby allowing the second body member 32 to be locked to the first and third body members 31 and 33.

The inner coupling body 19 includes a nozzle insertion port 39 configured to receive a nozzle distal end 2 of the nozzle 1. The nozzle insertion port 39 is fitted with a plurality of seal rings 40 to sealingly engage the outer peripheral surface of the nozzle distal end 2. Further, the inner coupling body 19 includes, on its outer peripheral surface 19a, a seal ring accommodating groove 19b accommodating a seal ring 41. The seal ring 41 allows the inner coupling body 19 to be sealingly engaged with a peripheral wall surface 42 of the passage 14 in the outer coupling body 18.

The filtration member 20 is a cylindrical member having a cylindrical part 20a extending in the direction of the longitudinal axis L, an inlet opening portion 20b opened at the upstream end of the cylindrical part 20a to communicate with the upstream opening 22, and a downstream closing portion 20c closing the downstream end of the cylindrical part 20a. The filtration member 20 is detachably attached to the inner coupling body 19 by threaded engagement of an externally threaded portion 20d at the upstream end of the filtration member 20 with an internally threaded portion 30 of the inner coupling body 19. The cylindrical part 20a is provided with a filtration portion 20g comprising a plurality of radially extending filtration holes 20e and a circular cylindrical filtration sheet 20f covering the filtration holes 20e from radially inside. The fluid passage 16, which is formed by the outer coupling body 18 and the inner coupling body 19, is divided by the filtration member 20 into an upstream pre-filtration passage section 16a and a downstream post-filtration passage section 16b. Further, a downstream portion 16c of the pre-filtration passage section 16a and an upstream portion 16d of the post-filtration passage section 16b are divided from each other in the radial direction. The downstream portion 16c of the pre-filtration passage section 16a constitutes a flow path located inside the cylindrical part 20a of the filtration member 20, and the upstream portion 16d of the post-filtration passage section 16b constitutes a passage of annular cross-section formed between the outer peripheral surface 20h of the filtration member 20 and the peripheral wall surface 42 of the fluid passage 16. Thus, the downstream portion 16c of the pre-filtration passage section 16a and the upstream portion 16d of the post-filtration passage section 16b are radially communicated with each other through the filtration portion 20g of the cylindrical part 20a.

The filtration member 20 further includes a flange portion 20i projecting radially outward from the cylindrical part 20a. The flange portion 20i faces, in the direction of the longitudinal axis L, a retaining portion 43 extending radially inward from the peripheral wall surface 42 of the passage 14 to suppress displacement of the filtration member 20 toward the downstream opening 23. For example, when high-pressure hydrogen passes through the fluid passage 16 in the male coupling member 10 from the upstream opening 22 to the downstream opening 23, the filtration member 20 is subjected to a great force acting in a direction toward the downstream opening 23 in the direction of the longitudinal axis L. Therefore, as the male coupling member 10 is repeatedly used, the threaded engagement between the filtration member 20 and the inner coupling body 19 may loosen, which may cause the filtration member 20 to move toward the downstream side. In this regard, however, even if the threaded engagement loosens, the flange portion 20i abuts against the retaining portion 43 of the outer coupling body 18; therefore, the filtration member 20 cannot be further displaced toward the downstream side. It should be noted that the flange portion 20i is provided with a plurality of through-holes 20j extending therethrough in the direction of the longitudinal axis L at a position radially inward of the retaining portion 43, so that the fluid flows through the through-holes 20j.

In the male coupling member 10, the fluid supplied from the upstream opening 22 passes through the pre-filtration passage section 16a in the direction of the longitudinal axis L and reaches the downstream portion 16c of the pre-filtration passage section 16a, which is formed inside the filtration member 20. In the downstream portion 16c, the fluid changes its direction of flow to radially outward and passes radially through the filtration portion 20g of the filtration member 20 to reach the upstream portion 16d of the post-filtration passage section 16b. At this time, dust contained in the fluid moves through the pre-filtration passage section 16a in the direction of the longitudinal axis L, being carried by the flow of fluid. In the downstream portion 16c, the dust is forced by inertia to continue moving rectilinearly in the direction of the longitudinal axis L. Relatively large dust particles are subjected to large inertia forces and thus pass through the downstream portion 16c in the direction of the longitudinal axis L despite being subjected to a force toward the filtration portion 20g from the fluid which has changed its direction of flow, and the dust particles reach and are trapped in a dust collecting part 44 provided in the downstream closing portion 20c. Thus, at least part of the dust contained in the fluid is trapped in the dust collecting part 44. Accordingly, the amount of dust trapped in the filtration portion 20g of the filtration member 20 is reduced. As a result, the replacement cycle of the filtration member 20 can be extended.

The check valve 48 is held in the second body member 32 displaceably in the direction of the longitudinal axis L and urged toward the upstream side (leftward as shown in FIGS. 1 and 2) by a spring 50 so that a forward end closing surface 48a of the check valve 48 is pressed against a valve seat surface 52 of the second body member 32. When the forward end closing surface 48a is pressed against the valve seat surface 52 to close an intermediate opening 54 of the fluid passage 16, as shown in FIG. 1, the fluid passage 16 is closed. When the male coupling member 10 is coupled to the nozzle 1 at the hydrogen supply station, as shown in FIG. 2, hydrogen is supplied into the male coupling member 10. When a pressure higher than a predetermined level is applied to the upstream side of the male coupling member 10, the check valve 48 is displaced toward the downstream side (rightward as shown in FIGS. 1 and 2) against the urging force of the spring 50. The second body member 32 has a plurality of lateral openings 56 formed to open in the radial direction. When a lateral closing portion 48b of the check valve 48 is displaced toward the downstream side beyond the lateral openings 56, the intermediate opening 54 and the lateral openings 56 are communicated with each other, and the fluid passage 16 communicates between the upstream opening 22 and the downstream opening 23. Thus, the fluid received from the upstream opening 22 is allowed to flow to the downstream opening 23. The second body member 32 further includes a back-pressure opening 60 formed in a downstream end portion 58. Through the back-pressure opening 60, the pressure at the downstream opening 23 is applied to a rear end surface 48c of the check valve 48. Consequently, when the pressure at the downstream opening 23 is higher than the pressure at the upstream opening 22, the check valve 48 is pressed by pressing force generated by the differential pressure between the upstream opening 22 and the downstream opening 23 in addition to the urging force of the spring 50 to close the intermediate opening 54, thereby inhibiting backflow from the downstream opening 23 toward the upstream opening 22.

Figure 3:
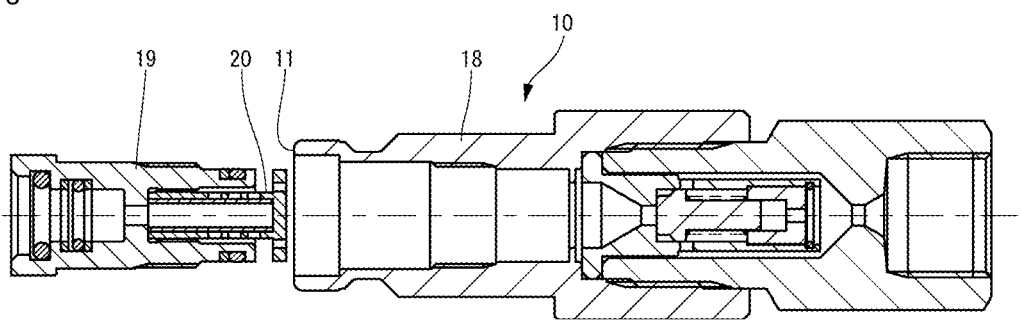
FIG. 3 is an illustration of an inner coupling body and a filtration member detached from an outer coupling body.

As shown in FIG. 3, the male coupling member 10 is configured to enable the inner coupling body 19 to be detached from the outer coupling body 18 from the first end 11 side thereof. The filtration member 20 is attached to the inner coupling body 19, as described above; therefore, as the inner coupling body 19 is detached, the filtration member 20 is detached together with the inner coupling body 19. Accordingly, with the male coupling member 10, the filtration member 20 can be taken out without detaching the outer coupling body 18 from another member, e.g. the vehicle body, and the pipe, to which the outer coupling body 18 is secured. Therefore, the operation of replacing the filtration member 20 can be easily performed.

Figure 4:
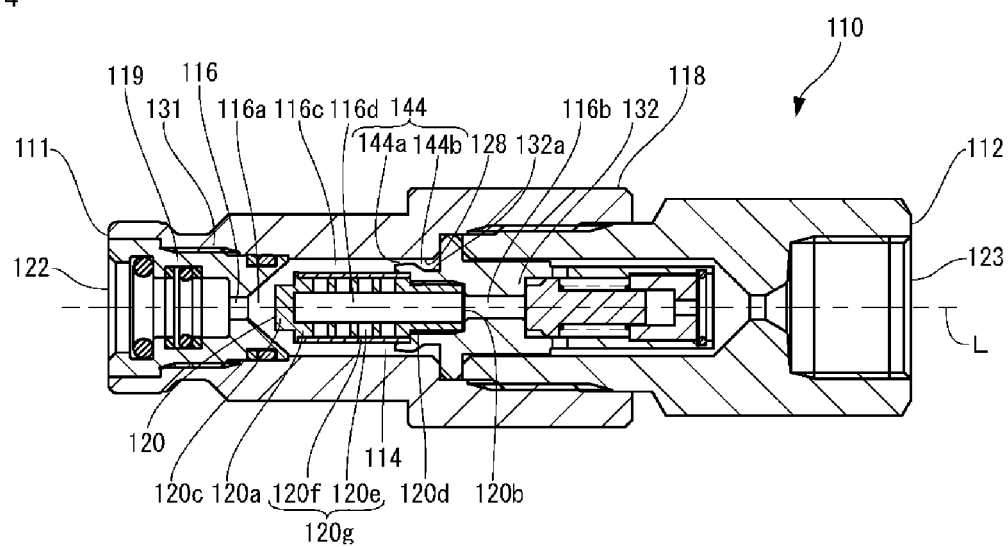
FIG. 4 is a sectional view of a male coupling member according to a second form of the present disclosure.

FIG. 4 shows a male coupling member 110 according to a second form of the present disclosure. In the male coupling member 110, a filtration member 120 is attached to a second body member 132 of an outer coupling body 118. The filtration member 120 includes an outlet opening portion 120b opened at a downstream end of a cylindrical part 120a to communicate with a downstream opening 123, and an upstream closing portion 120c closing an upstream end of the cylindrical part 120a. The filtration member 120 further includes a filtration portion 120g comprising filtration holes 120e formed in a cylindrical part 120a and a filtration sheet 120f configured to cover the filtration holes 120e from the outside. The filtration member 120 is disposed in reverse relation to the filtration member 20 in the first form. That is, the filtration member 120 is detachably secured to the second body member 132 through an externally threaded portion 120d at the downstream end. The filtration member 120 divides a fluid passage 116 into a pre-filtration passage section 116a and a post-filtration passage section 116b. A downstream portion 116c of the pre-filtration passage section 116a constitutes an annular flow path located outside the cylindrical part 120a of the filtration member 120, and an upstream portion 116d of the post-filtration passage section 116b constitutes a rectilinear passage located inside the cylindrical part 120a of the filtration member 120.

The pre-filtration passage section 116a includes a dust collecting part 144 formed downstream of the downstream portion 116c. The dust collecting part 144 is an annular recess formed between the inner peripheral surface 128 of the first body member 131 of the outer coupling body 118 and the outer peripheral surface 132a of the second body member 132. The dust collecting part 144 includes an annular inlet portion 144a having a narrow radial width and communicates with the downstream portion 116c of the pre-filtration passage section 116a, and an annular dust storing portion 144b provided continuously with the inlet portion 144a and having a wider radial width than that of the inlet portion 144a.

When dust is contained in the fluid supplied from an upstream opening 122, the dust moves through the pre-filtration passage section 116a, together with the fluid, and reaches the annular downstream portion 116c, which extends in the direction of the longitudinal axis L. In the downstream portion 116c, the fluid changes its direction of flow to radially inward to pass radially through the filtration portion 120g of the filtration member 120 and reaches the post-filtration passage section 116b. Meanwhile, dust contained in the fluid is acted upon by inertia, so that the dust is forced to continue moving rectilinearly through the downstream portion 116c toward the downstream opening 123 in the direction of the longitudinal axis L. Relatively large dust particles are subjected to large inertia forces and thus pass through the downstream portion 116c in the direction of the longitudinal axis L despite being subjected to a force directed toward the filtration portion 120g from the fluid which has changed its direction of flow, and the dust particles reach and are trapped in the dust collecting part 144. The dust collecting part 144 comprises the narrow-width inlet portion 144a and the wide-width dust storing portion 144b, as described above. Accordingly, once the dust reaches the dust storing portion 144b, dust cannot easily return to the downstream portion 116c through the narrow-width inlet portion 144a.

The male coupling member 110 is configured such that an inner coupling body 119 is attachable to and detachable from the outer coupling body 118 from a first end 111 of the outer coupling body 118 in a similar way as the male coupling member 10 according to the first form. When the inner coupling body 119 is attached to the outer coupling body 118, the filtration member 120 is held in a passage 114 undetachably. When the inner coupling body 119 is detached from the outer coupling body 118, the filtration member 120 becomes detachable from the first end 111 of the outer coupling body 118. Accordingly, with the male coupling member 110, the filtration member 120 can be taken out without detaching the outer coupling body 118 from another member, e.g. the vehicle body, to which the outer coupling body 118 is secured. Therefore, the operation of replacing the filtration member 120 can be easily performed.

Although in the foregoing forms the male coupling member according to the present disclosure has been explained as a receptacle for supplying hydrogen into a fuel cell vehicle, the male coupling member may also be constructed as a male coupling member for other use applications, as a matter of course. Further, in the foregoing forms, the first end 11/111, which is inserted and fitted into the nozzle (female coupling member) 1 is defined as the upstream end, and the second end 12/112, which is opposite to the first end 11 (111), is defined as the downstream end. However, the male coupling member according to the present disclosure may be configured to be used in such a manner that the first end is defined as the downstream end, and the second end as the upstream end.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A male coupling member detachably couplable to an associated female coupling member, the male coupling member comprising:
    an outer coupling body having a first end configured to be inserted into the associated female coupling member, a second end opposite the first end, and a passage extending from the first end to the second end in a direction parallel to a longitudinal axis;
    an inner coupling body coaxially disposed in the passage of the outer coupling body and detachably attached to the first end of the outer coupling body; and
    a filtration member detachably attached to the inner coupling body,
    wherein the filtration member is held in the passage of the outer coupling body when the inner coupling body is attached to the outer coupling body,
    wherein the filtration member is detachable from the inner coupling body when the inner coupling body is detached from the outer coupling body,
    wherein the filtration member includes a cylindrical part, a downstream closing end portion, and a flange portion, wherein the cylindrical part has a filtration portion and extending parallel to the longitudinal axis, the downstream closing end portion is operable to close the cylindrical part and is positioned between the filtration portion and the second end of the outer coupling body, and the flange portion radially projects from the cylindrical part,
    wherein the outer coupling body includes a retaining portion that extends radially inward from a peripheral wall surface of the passage and is positioned between the second end of the outer coupling body and the flange portion of the filtration member, and
    wherein the flange portion and the retaining portion are configured to form an abutment to suppress displacement of the filtration member toward the second end of the outer coupling body in the direction parallel to the longitudinal axis.

2. The male coupling member of claim 1, wherein the outer coupling body and the inner coupling body are cylindrical.

3. The male coupling member of claim 1 further comprising a seal ring, wherein:
    the inner coupling body has a nozzle insertion port configured to receive a nozzle distal end of the associated female coupling member, and
    the seal ring is attached to an inner peripheral surface of the nozzle insertion port of the inner coupling body and is configured to sealingly engage the nozzle distal end of the female coupling member when the nozzle insertion port receives the nozzle distal end.

4. The male coupling member of claim 1, wherein the flange portion includes at least one through-hole extending therethrough in the direction parallel to the longitudinal axis, the at least one through-hole constituting part of a fluid flow path.

5. The male coupling member of claim 4 further comprising a seal ring, wherein:

the inner coupling body has a nozzle insertion port configured to receive a nozzle distal end of the associated female coupling member, and the seal ring is attached to an inner peripheral surface of the nozzle insertion port of the inner coupling body and is configured to sealingly engage the nozzle distal end of the female coupling member when the nozzle insertion port receives the nozzle distal end.

* * * * *